(12) United States Patent
Holm et al.

(10) Patent No.: US 12,730,011 B2
(45) Date of Patent: Sep. 8, 2026

(54) PROCESS TEMPERATURE SENSOR WITH IMPROVED THERMAL ISOLATION

(71) Applicant: Rosemount Inc., Shakopee, MN (US)

(72) Inventors: Nathan K. Holm, Mound, MN (US); Ryan C. Tarras, Savage, MN (US); Brandon L. Swick, Eden Prairie, MN (US); Greg E. Gindele, Maple Lake, MN (US); Cory M. Robinson, Mayer, MN (US); Jason H. Rud, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 464 days.

(21) Appl. No.: 18/338,783

(22) Filed: Jun. 21, 2023

(65) Prior Publication Data

US 2024/0426673 A1 Dec. 26, 2024

(51) Int. Cl.
*G01K 1/143* (2021.01)
*G01K 1/024* (2021.01)
*G01K 1/08* (2021.01)

(52) U.S. Cl.
CPC ............ *G01K 1/143* (2013.01); *G01K 1/024* (2013.01); *G01K 1/08* (2013.01); *G01K 2215/00* (2013.01)

(58) Field of Classification Search
None
See application file for complete search history.

(56) References Cited

U.S. PATENT DOCUMENTS 7,060,949 B1 6/2006 Davis et al.
8,523,432 B2 9/2013 Mujumdar et al.
8,770,837 B2 7/2014 Egan et al.
9,416,731 B2 8/2016 Berkland et al.
10,247,615 B2 4/2019 Martinez et al.
2005/0036622 A1* 2/2005 Hay .................... H04L 63/0428 380/270

(Continued)

FOREIGN PATENT DOCUMENTS

CN 107515053 A 12/2017
JP 1994-160124 A2 6/1994

(Continued)

OTHER PUBLICATIONS

International Search Report and Written Opinion for PCT Patent Application No. PCT/US2024/033735, dated Sep. 27, 2024, 11 pages.

*Primary Examiner* — Erica S Lin

(74) *Attorney, Agent, or Firm* — Christopher R. Christenson; Kelly, Holt & Christenson, P.L.L.C.

(57) ABSTRACT

A temperature sensor assembly includes a temperature sensor body having a bore defined therein. The bore has a first internal surface feature and a second internal surface feature. A cap is disposed within the bore of the temperature sensor body proximate an end of the temperature sensor body. A temperature sensitive element is disposed within the cap. A first elastomeric ring is disposed about the cap and configured to interact with the first internal surface feature of the temperature sensor body. A second elastomeric ring is disposed about the cap and spaced from the first elastomeric ring. The second elastomeric ring is configured to interact with the second internal surface feature of the temperature sensor body. A wireless field device including the temperature sensor assembly is also provided.

22 Claims, 5 Drawing Sheets

(56) References Cited

U.S. PATENT DOCUMENTS

| | | | | |
|---|---|---|---|---|
| 2010/0218992 | A1* | 9/2010 | Smith | H01R 4/643 174/84 R |
| 2019/0145658 | A1* | 5/2019 | Hodgkinson | B05B 7/22 392/478 |

FOREIGN PATENT DOCUMENTS

| | | | |
|---|---|---|---|
| JP | 2009-092395 | A2 | 4/2009 |
| JP | 3160911 | U | 7/2010 |
| KR | 101578117 | B1 | 12/2015 |

* cited by examiner

PROCESS TEMPERATURE SENSOR WITH IMPROVED THERMAL ISOLATION

BACKGROUND

The present invention relates generally to industrial process control and monitoring systems. More particularly, the present invention relates to process temperature sensors for use in such systems.

In industrial settings, process control systems are used to monitor and control inventories and operation of industrial and chemical processes, and the like. Typically, the system that performs these functions uses field devices distributed at key locations in the industrial process coupled to control circuitry in a control room by a process control loop. The term “field device” refers to any device that performs a function in a distributed control or process monitoring system, including all devices used in the measurement, control, and monitoring of industrial processes. Usually, such field devices have a field-hardened enclosure so that they can be installed outdoors in relatively rugged environments and be able to withstand climatological extremes of temperature, humidity, vibration, and mechanical shock.

Typically, each field device also includes communication circuitry that is used for communicating with a process controller, or other field devices, or other circuitry, over the process control loop. In some installations, the process control loop is also used to deliver a regulated current and/or voltage to the field device for powering the field device. The process control loop also carries data, either in an analog or digital format.

In some installations, wireless technologies are now used to communicate with field devices. Wireless operation simplifies field device wiring and setup. Wireless installations are currently used in which the field device includes a local power source.

One important parameter often measured and controlled in the process control industry is the temperature of a surface or process fluid. It is known to place a temperature sensitive element, such as a thermocouple, thermistor, or RTD inside a thermowell to measure a process fluid temperature. It is also known to affix or otherwise mount a temperature sensor to a surface in order to measure the temperature of the surface. One particular application for such surface-mounted temperature sensors is for lower temperature (−40 degrees Celsius to 100 degrees Celsius). The assemblies that currently exist for such low temperature surface measurements are typically suited for higher tier instrumentation being that they require advanced functionality for measurement. These assemblies typically require added design complexity, manufacturing difficulty and cost. Providing an improved surface-mount low temperature measurement assembly would allow such assemblies to be used to greater extent in more applications.

SUMMARY

A temperature sensor assembly includes a temperature sensor body having a bore defined therein. The bore has a first internal surface feature and a second internal surface feature. A cap is disposed within the bore of the temperature sensor body proximate an end of the temperature sensor body. A temperature sensitive element is disposed within the cap. A first elastomeric ring is disposed about the cap and configured to interact with the first internal surface feature of the temperature sensor body. A second elastomeric ring is disposed about the cap and spaced from the first elastomeric ring. The second elastomeric ring is configured to interact with the second internal surface feature of the temperature sensor body. A wireless field device including the temperature sensor assembly is also provided.

DETAILED DESCRIPTION OF ILLUSTRATIVE EMBODIMENTS

For surface temperature sensors, placement of the element is important to achieve reasonable measurement accuracy, drift, and repeatability. This can be difficult since the element is sensitive to thermal gradients that are included throughout the assembly. Inline conduction gradients are typically generated by the temperature difference of the connection housing and the process connections. Environmental exposure can induce perpendicular gradients through convection and radiation. Both scenarios will create inaccuracy and variability in the measured output. External insulation may be applied to control the environmental exposure, but this is not desirable by end users and does not solve the conduction gradient challenge.

Surface temperature sensors can lose contact with the surface being measured causing inconsistencies and inaccurate temperature readings. Some solutions may use a spring to bias the sensor against the surface, but the utilization of a spring results in a higher cost and device that is more difficult to manufacture.

Embodiments described herein generally reduce heat transfer from a temperature sensor housing to the temperature sensor to provide thermal isolation from surrounding housing material thereby reducing the influence of thermal conductance at ambient temperature. In particular examples, the temperature sensor is a grounded thermocouple and thermal isolation is created using elastomeric material between the temperature sensor housing and the temperature sensor. The elastomeric material also provides electrical isolation between the temperature sensor and the temperature sensor housing. Further, in some examples, the elastomeric material includes a pair of o-rings that allow variation is surface curvature/texture/expansion/contraction while maintaining contact pressure after the device has been installed.

Figure 1:
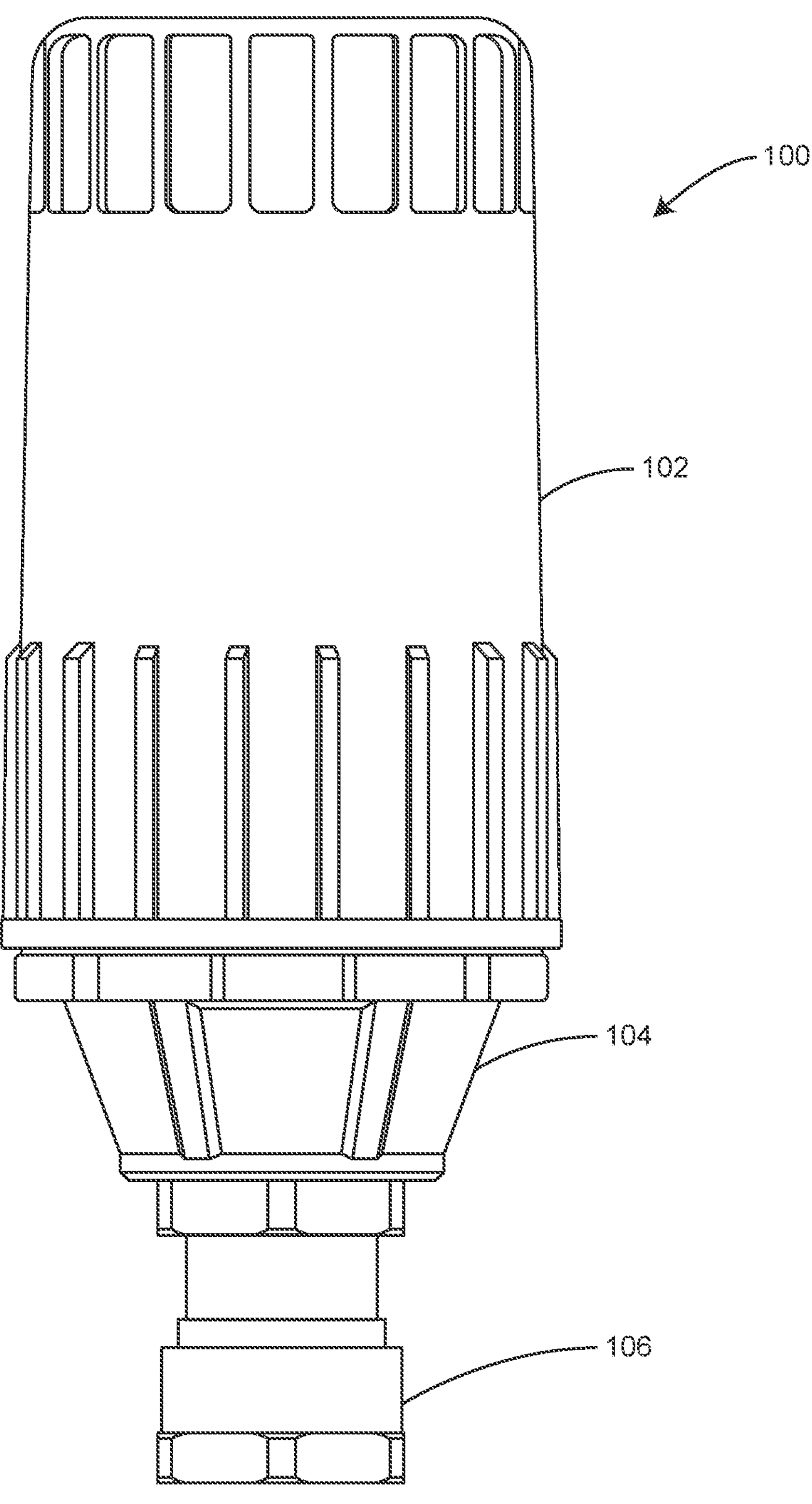
FIG. 1 is a diagrammatic view of a wireless field device with which embodiments described herein are particularly useful.

FIG. 1 is a diagrammatic view of a wireless field device with which embodiments described herein are particularly useful. In the illustrated example, field device 100 is a wireless process variable transmitter that measures a process variable, such as surface temperature, and transmits an indication of the surface temperature to a remote device or control room (not shown). Field device 100 includes an enclosed, weather-proof compartment 102 that is removably coupled to sensing adapter 104. Sensing adapter 104 may take various forms depending on the type of field element used. For example, if the field element is a process variable temperature sensor, sensing adapter may appear as provided in FIG. 1 and be coupled to a process temperature sensor body 106. Sensor body 106, may then be coupled to an industrial process to measure the temperature of a surface. Enclosure 102 and/or sensor adaptor 104 can be constructed from any suitable material as long as enclosure 102 is watertight.

Figure 2A:
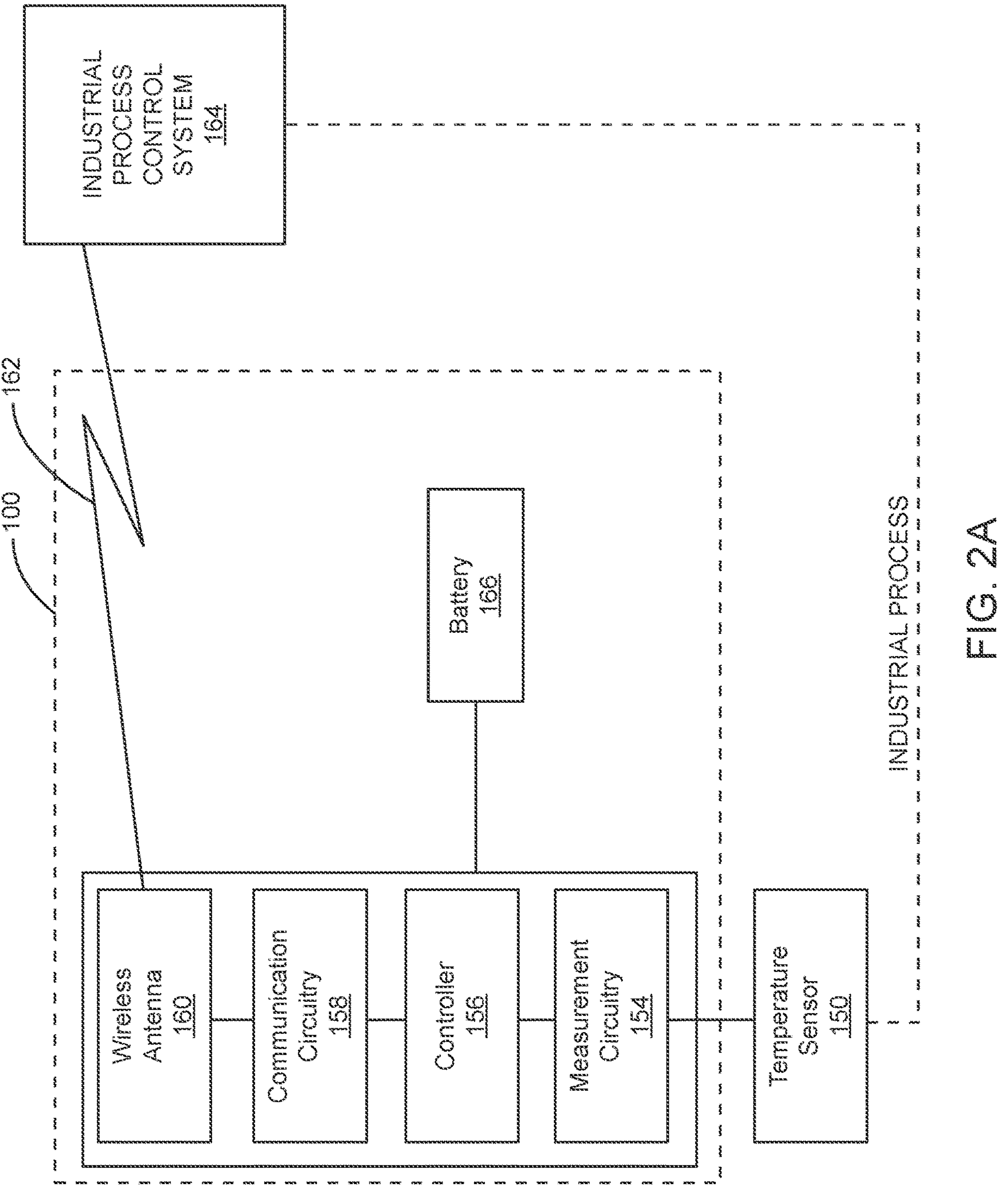
FIG. 2A is a diagrammatic view of one particular field device with which embodiments described herein are useful.

FIG. 2A is a diagrammatic view of a wireless field device 100 with which embodiments described herein are particularly applicable. As shown in FIG. 2A, wireless field device 100 is coupled to temperature sensor 150, which is, in turn, coupled to an industrial process 152. Temperature sensor 150 may be an RTD, thermistor, thermocouple, or other suitable temperature sensor. In one embodiment, temperature sensor 150 is a grounded thermocouple. Temperature sensor 150 is coupled to measurement circuitry 154 of wireless transmitter 100. Measurement circuitry 154 receives an electrical output from temperature sensor 150 that represents a temperature that is sensed from an industrial process 152. Measurement circuitry 154 may include suitable analog-to-digital conversion circuitry to transform an analog sensor signal into a digital representation. Additionally, measurement circuitry 154 may include suitable filter circuitry, amplification circuitry, and/or switching circuitry in order to provide compatibility for a variety of different sensor types. Measurement circuitry 154 provides an output representative of the temperature to controller 156.

Controller 156 may be any suitable circuitry or combination of circuitry that executes programmatic steps to generate a process variable output based upon signals received from measurement circuitry 154. In one example, controller 156 is a microprocessor. Controller 156 is coupled to measurement circuitry 154 to receive information indicative of the electrical characteristic of the temperature sensitive element. For example, controller 156 may receive a digital indication of an emf of a thermocouple from measurement circuitry 154. Controller 156 is also coupled to communication circuitry 158 which can receive the process variable output information from controller 156 and provide wireless industry standard process communication signals based thereon. Preferably, communication circuitry 158 allows bidirectional wireless communication utilizing wireless antenna 160. As shown diagrammatically at reference numeral 162, this bidirectional wireless communication generally communicates with the industrial process control system 164. An example of a suitable wireless process communication protocol is set forth in IEC 62591. However, other examples instead of or in addition to IEC 62591 are also contemplated.

As shown in FIG. 2A, wireless field device 100 also includes a battery assembly 166. Battery assembly 166 is electrically coupled to other circuitry of field device 100 to supply operating power to field device 100. The battery may be a primary, non-rechargeable battery or it may be a rechargeable battery.

Figure 2B:
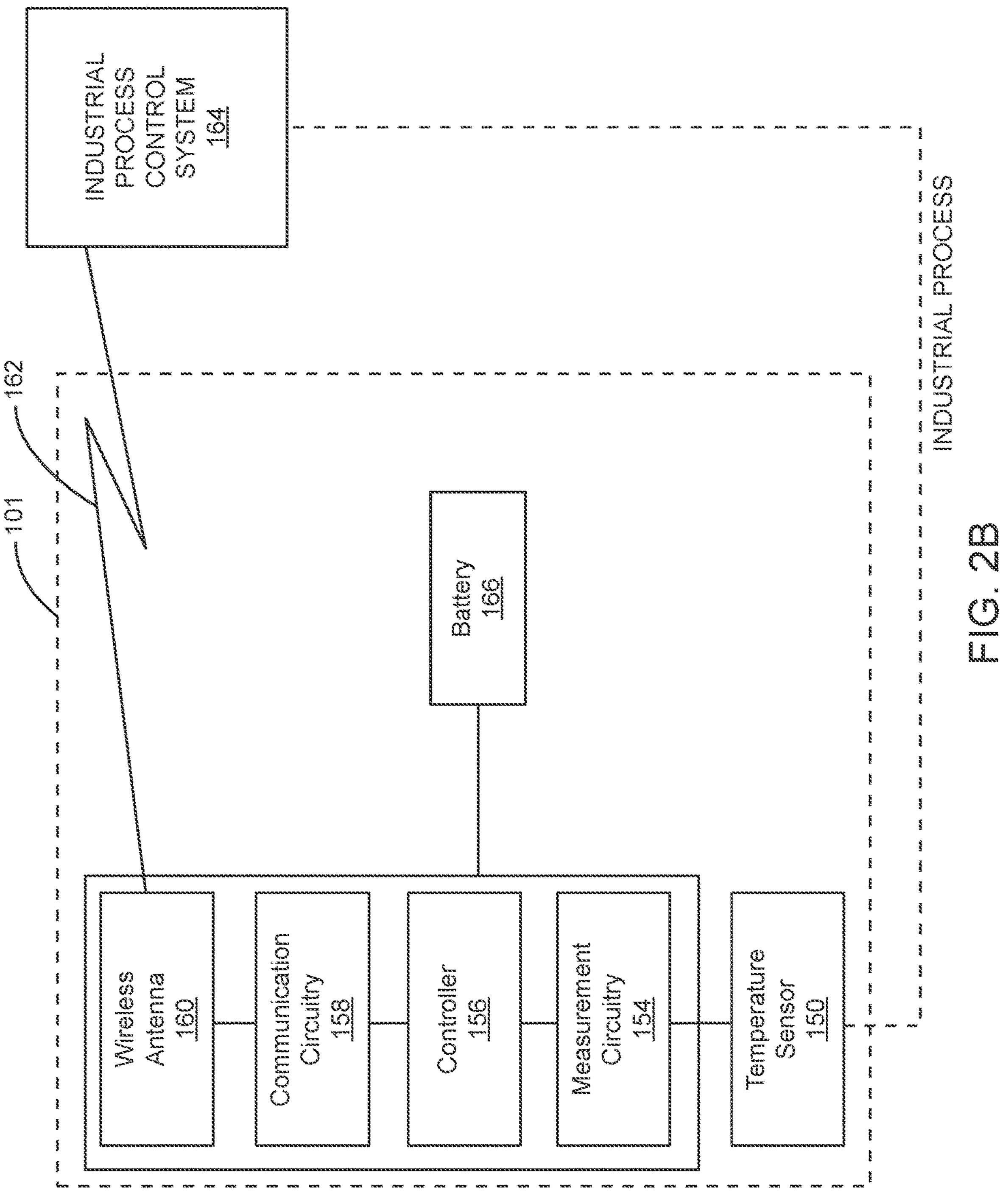
FIG. 2B is a diagrammatic view of one particular field device with which embodiments described herein are useful.

FIG. 2B is a diagrammatic view of a wireless field device 101 with which embodiments described herein are particularly applicable. Wireless field device 101 is similar to wireless field device 100 (shown in FIG. 2A) and like components are numbered similarly. In the embodiment illustrated in FIG. 2B, temperature sensor 150 is a component of field device 100 and contained within the field device 101.

Figure 3:
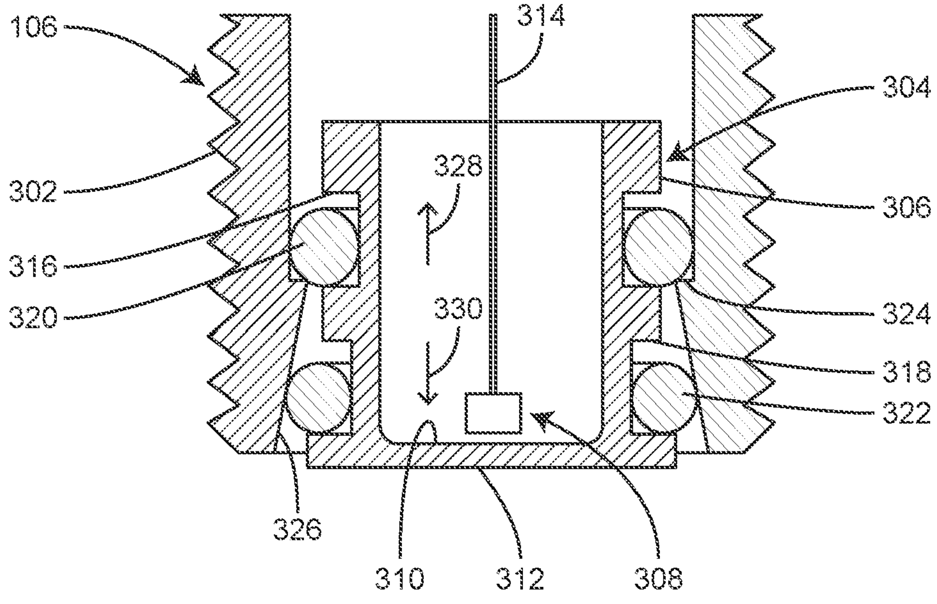
FIG. 3 is a diagrammatic view of a portion of a temperature sensor assembly with improved thermal isolation in accordance with an embodiment of the present invention.

FIG. 3 is a diagrammatic view of a portion of a temperature sensor assembly with improved thermal isolation in accordance with an embodiment of the present invention. FIG. 3 illustrates a lower portion of temperature sensor body 106 having a cylindrical shape and an externally threaded portion 302 that enables temperature sensor body 106 to couple to a process. Temperature sensor assembly 304 includes a cap 306 coupled to a temperature sensitive element 308 at surface 310. Cap 306 is preferably formed of a metal having relatively high thermal conductivity. The metal can be selected to minimize galvanic corrosion based on the material of the surface to be measured.

Surface 312 of cap 306 is configured to be pressed against a process surface to measure the temperature of the process surface. Temperature sensitive element 308 may be any suitable device that has an electrical characteristic, such as resistance, electromotive force (emf), or capacitance, that changes in response to temperature. Temperature sensitive element 308 may be a thermocouple, thermistor, RTD, or digital integrated circuit. In the illustrated embodiment, temperature sensitive element 308 is a grounded thermocouple. A thermocouple is a device formed of two dissimilar metals that generates an emf based on its temperature. As shown, the grounded thermocouple is electrically coupled to measurement circuitry 154 (shown in FIG. 2) via a plurality of conductors illustrated diagrammatically at line 314. As shown, grounded thermocouple 308 is welded or otherwise coupled directly to inside surface 310 of sensor cap 306 which results in an effective heat transfer and thus faster response times.

As shown in FIG. 3, cap 306 includes first and second annular rings or channels 316, 318 that are configured to engage first and second elastomeric rings 320, 322, respectively. The elastomeric rings 320, 322 may be o-rings having a circular cross-section, as shown in FIG. 3, or they may have any suitable cross-section. Elastomeric rings may be formed of any suitable elastomer, such as silicone rubber, unsaturated rubber, Fluoroelastomers, Perfluoroelastomers, and others. Preferably, elastomeric rings 320, 322 also form an environmental seal between sensor cap 306 and temperature sensor body 106. Elastomeric rings 320, 322 also help thermally isolate sensor cap 306 from temperature sensor body 106. In some embodiments, the elastomer may be chosen based on its compliance, its ability to create an environmental seal, and/or its thermal conductivity.

Temperature sensor body has a pair of internal surface features 324, 326 that interact with elastomeric rings 320, 322, respectively. More specifically, in the illustrated example, feature 324 is a shoulder that engages elastomeric ring 320 to generate a force component in the direction indicated by arrow 328. Similarly, feature 326 is a tapered surface that engages elastomeric ring 322 to generate a force having a component in the direction indicated by arrow 330. Once cap 306 is mounted within temperature sensor body 106, these forces oppose one another to maintain the cap in temperature sensor body. However, the compliance of the elastomeric rings still allows some axial movement of cap 306 with respect to temperature sensor body 106.

Figure 4A:
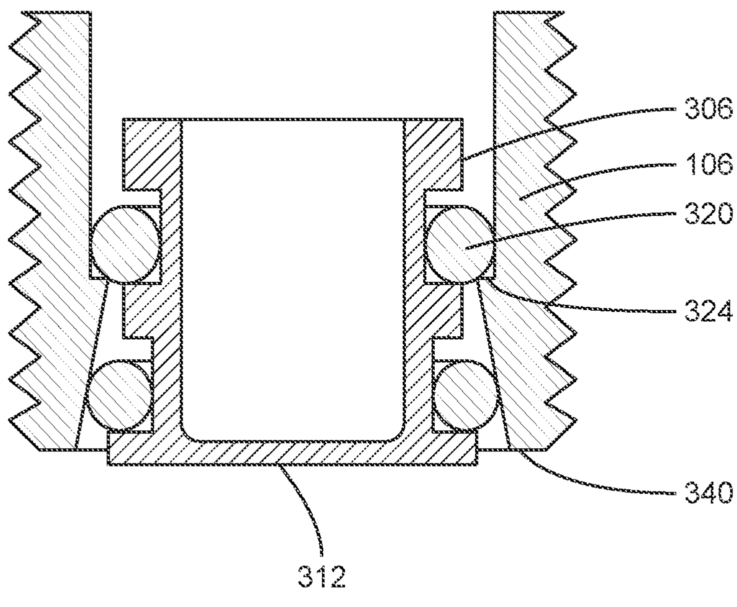
FIGS. 4A and 4B are cross-sectional views of a cap disposed within a temperature sensor body at different axial displacements.
Figure 4B:
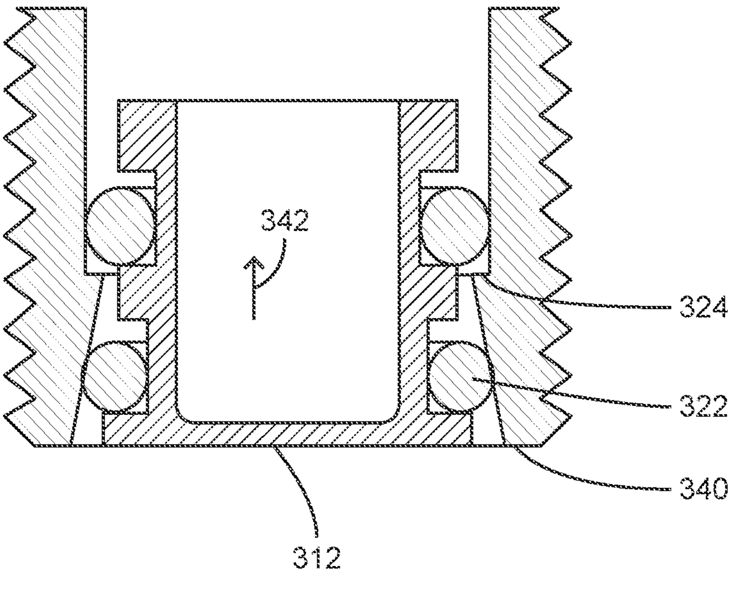

FIGS. 4A and 4B are cross-sectional views of a cap disposed within a temperature sensor body at different axial displacements. As shown in FIG. 4A, surface 312 of cap 306 has extended beyond the end 340 of temperature sensor body 106. In this position, shoulder 324 engages elastomeric ring 320 and inhibits cap 306 from extending further beyond end 340. FIG. 4B shows surface 312 of cap 306 substantially flush with end 340 of temperature sensor body 106. As can be seen, elastomeric ring 320 has separated from shoulder 324 and instead, ring 322 is compressed further within taper 326 resisting further axial movement of cap 306 in the direction indicated by arrow 342.

Embodiments described above provide a temperature sensing assembly with improved thermal isolation. Embodiments allow some positional flexibility of the sensing mechanism to keep it in constant contact with the surface to be measured. As shown, the sensing mechanism can be threaded into a housing until the surface of the cap touches the surface to be measured. Once the surface to be measured begins to oppose the insertion force, it will have a flexible amount of positioning to perform any small changes to the surface to housing distances. This flexibility enables the sensor to keep constant pressure on the surface and ensure no gaps exist between the cap and the surface.

Although the present invention has been described with reference to preferred embodiments, workers skilled in the art will recognize that changes may be made in form and detail without departing from the spirit and scope of the invention.

What is claimed is:

1. A temperature sensor assembly comprising:

a temperature sensor body having a bore defined therein, the bore having a first internal surface feature and a second internal surface feature;

a cap disposed within the bore of the temperature sensor body proximate an end of the temperature sensor body;

a temperature sensitive element disposed within the cap;

a first elastomeric ring disposed about the cap and configured to interact with the first internal surface feature of the temperature sensor body; and a second elastomeric ring disposed about the cap and spaced from the first elastomeric ring, the second elastomeric ring being configured to interact with the second internal surface feature of the temperature sensor body.

2. The temperature sensor assembly of claim 1, wherein interaction between the first elastomeric ring and the first internal surface feature generates an axial force in a first direction and interaction between the second elastomer ring and the second surface feature generates axial force in a second direction opposite the first direction.

3. The temperature sensor assembly of claim 1, wherein an outer surface of the temperature sensor body is threaded.

4. The temperature sensor assembly of claim 1, wherein the first internal surface feature is a shoulder.

5. The temperature sensor assembly of claim 1, wherein the second internal surface feature is a taper.

6. The temperature sensor assembly of claim 1, wherein the cap includes a first annular ring and a second annular ring.

7. The temperature sensor assembly of claim 6, wherein the first elastomeric ring is disposed in the first annular ring of the cap and the second elastomeric ring is disposed in the second annular ring of the cap.

8. The temperature sensor assembly of claim 1, wherein the cap includes a surface configured to be pressed against a process surface to measure a temperature of the process surface.

9. The temperature sensor assembly of claim 8, wherein the temperature sensitive element is affixed to the cap opposite the surface.

10. The temperature sensor assembly of claim 9, wherein the temperature sensitive element is a grounded thermocouple.

11. The temperature sensor assembly of claim 1, wherein the cap is formed of metal.

12. The temperature sensor assembly of claim 11, wherein the metal is selected to reduce galvanic corrosion.

13. The temperature sensor assembly of claim 1, wherein the temperature sensitive element is selected from the group consisting of a thermocouple, an RTD, a thermistor, and digital integrated circuit.

14. The temperature sensor assembly of claim 1, wherein at least one of the first and second elastomeric rings is formed of an elastomer selected from the group consisting of silicone rubber, unsaturated rubber, Fluoroelastomer, and Perfluoroelastomer.

15. The temperature sensor assembly of claim 1, wherein the first and second elastomeric rings thermally isolate the cap from the temperature sensor body.

16. A field device comprising:

a weather-proof compartment;

a sensing adapter removably coupled to the weather-proof compartment;

a temperature sensor body coupled to the sensing adapter, the temperature sensor body having a bore defined therein, the bore having a first internal surface feature and a second internal surface feature;

a cap disposed within the bore of the temperature sensor body proximate an end of the temperature sensor body;

a temperature sensitive element disposed within the cap;

a first elastomeric ring disposed about the cap and configured to interact with the first internal surface feature of the temperature sensor body; and a second elastomeric ring disposed about the cap and spaced from the first elastomeric ring, the second elastomeric ring being configured to interact with the second internal surface feature of the temperature sensor body.

17. The field device of claim 16, and further comprising:

measurement circuitry disposed within the weather-proof compartment and electrically coupled to the temperature sensitive element;

a controller coupled to the measurement circuitry and configured to receive an indication from measurement circuitry relative to an electrical characteristic of the temperature sensitive element, the controller being configured to calculate a temperature output based on the received indication; and wireless communication circuitry coupled to the controller, the wireless communication circuitry being configured to communicate the temperature output to a remote device wirelessly.

18. The field device of claim 17, and further comprising a battery disposed within the weather-proof compartment, the battery configured to power the measurement circuitry, controller, and wireless communication circuitry.

19. The field device of claim 16, wherein interaction between the first elastomeric ring and the first internal surface feature generates an axial force in a first direction and interaction between the second elastomer ring and the second surface feature generates axial force in a second direction opposite the first direction.

20. The field device of claim 16, wherein the first internal surface feature is a shoulder.

21. The field device of claim 16, wherein the second internal surface feature is a taper.

22. The field device of claim 16, wherein at least one of the first and second elastomeric rings provides an environmental seal between the temperature sensor housing and the cap.

* * * * *